US009339742B2

(12) United States Patent
Schaller

(10) Patent No.: US 9,339,742 B2
(45) Date of Patent: *May 17, 2016

(54) DENSITY CURRENT BAFFLE FOR A CLARIFIER TANK

(76) Inventor: Earle Schaller, Palm Beach Gardens, FL (US)

( * ) Notice: Subject to any disclaimer, the term of this patent is extended or adjusted under 35 U.S.C. 154(b) by 459 days.

This patent is subject to a terminal disclaimer.

(21) Appl. No.: 13/368,470

(22) Filed: Feb. 8, 2012

(65) Prior Publication Data

US 2012/0248036 A1    Oct. 4, 2012

Related U.S. Application Data

(60) Provisional application No. 61/441,007, filed on Feb. 9, 2011.

(51) Int. Cl.
*B01D 21/02*    (2006.01)
*B01D 21/00*    (2006.01)

(52) U.S. Cl.
CPC ........ *B01D 21/0087* (2013.01); *B01D 21/0003* (2013.01); *B01D 21/0042* (2013.01); *B01D 2021/0078* (2013.01)

(58) Field of Classification Search
CPC ........... B01D 21/0003; B01D 21/0039; B01D 21/0042; B01D 21/0087; B01D 21/28; B01D 2021/0078
USPC .............. 210/521, 525, 528, 532.1, 539, 541; 220/654, 660
See application file for complete search history.

(56) References Cited

U.S. PATENT DOCUMENTS

| 5,252,205 | A | * | 10/1993 | Schaller | 210/521 |
| 5,597,483 | A | * | 1/1997 | Schaller | 210/541 |
| 7,416,662 | B2 | * | 8/2008 | Aditham et al. | 210/521 |
| 7,556,157 | B2 | * | 7/2009 | Schaller et al. | 210/521 |
| 7,722,776 | B2 | * | 5/2010 | Essemiani et al. | 210/521 |
| 7,726,494 | B2 | * | 6/2010 | Schaller et al. | 210/521 |
| 7,963,403 | B2 | * | 6/2011 | Schaller et al. | 210/521 |
| 7,971,731 | B2 | * | 7/2011 | Schaller | 210/521 |
| 8,083,075 | B2 | * | 12/2011 | Schaller et al. | 210/521 |
| 8,220,644 | B2 | * | 7/2012 | Schaller | 210/521 |
| 8,328,025 | B2 | * | 12/2012 | Schaller et al. | 210/521 |

* cited by examiner

*Primary Examiner* — Christopher Upton
(74) *Attorney, Agent, or Firm* — Sofer & Haroun, LLP

(57) ABSTRACT

In this respect, the present arrangement provides a density current baffle that employs a baffle that is dimensioned to balance the fact that larger horizontal projections of density current baffles improve performance while simultaneously recognizing that an overly large baffle would simply not correctly function, be unnecessarily large and complex and may in fact have a negative impact on the otherwise ordinary operation of flows within the clarifier tank. Thus, the present arrangement provides a baffle that improves performance while satisfying the desire to remain conservative in defining an upper limit for the projection. The horizontal projection of the baffle is structured according to the following equation:

$$HP = 24'' + 0.4 \text{ inches/foot} \times (\text{Diameter} - 30).$$

24 Claims, 22 Drawing Sheets

DENSITY CURRENT BAFFLE FOR A CLARIFIER TANK

RELATED APPLICATIONS

This application claims the benefit of priority from U.S. Provisional Patent Application No. 61/441,007, field on Feb. 9, 2011, the entirety of which is incorporated by reference.

FIELD OF THE INVENTION

This application relates to a baffle and baffle system for use in a solids-precipitating clarifier tank. More particularly, the application relates to a baffle and baffle system having a plurality of inter-engaged individual baffles secured to the clarifier tank peripheral wall.

PRIOR ART DISCUSSION

Passive baffle devices, also known in the art as a lamella gravity separators or settlers, are used in clarifier tanks for waste treatment for gravitationally separating suspended solids from solids containing carrier liquid or fluid suspensions. The clarifier tanks, with which such baffles are typically used, are circular or polygonal in shape in which a centrally mounted radially extending arm is slowly moved or rotated about the tank at or proximate to the surface of the carrier liquid.

Specifically, in wastewater treatment facilities utilizing secondary clarifiers, the clarifier's effectiveness in removing solids is perhaps the most important factor in establishing the final effluent quality of the facility. A major deterrent to effective removal is the presence of sludge density currents that cause hydraulic short circuits within the tank. These short circuits, in turn, allow solids concentrations to unintentionally bypass the tank's clarification volume and enter the effluent.

In the prior art, peripheral density current baffles are attached to the tank wall and directed downward at an angle into the tank. These baffles help to minimize the density currents and properly redirect the flow of solids away from the effluent and into the main clarification volume (center) of the tank. Usually the baffles are inclined at a 45° angle, but other angles ranging from 0° to 60° have been suggested and/or used in certain instances.

In addition to the angle of inclination of the baffle, the horizontal projection of the baffle is another factor that determines the extent to which the baffle can intercept and deflect the density currents in the clarifier tank. If the projection is too small, the baffle may not reach far enough into the path of the density currents to deflect them, regardless of the angle, and thus the currents will continue rising up the clarifier wall and carry lighter solids to the effluent launder. If the baffle projects too far into the tank it may adversely affect the settling of solids in the bottom of the clarifier tank (as desired in normal operations).

In some instances of the prior art, the horizontal projection may be related to the diameter of the clarifier using the following equation:

HP (inches)=18 inches+α(Diameter (ft)−30).

The term α in the above equation was originally defined as 0.2 inches per foot, and thus a horizontal projection for a baffle in a 100-foot diameter clarifier tank would be calculated to be 32 inches. This equation is independent of the baffle inclination angle.

Prior art suggestions include modifications to the above equation and suggested that larger projections were beneficial and thus a was increased to 0.3 inches per foot, such that the recommended projection for a 100-foot diameter clarifier was increased to 39 Inches.

However, although these density current baffle systems work to significantly reduce solids from entering the effluent, under greater load conditions these baffle systems occasionally fail, allowing for the above described short circuits.

SUMMARY

The present arrangement provides an improvement over the prior art in that a density current baffle is constructed for tanks with a greater horizontal projection over the prior art.

In this respect, the present arrangement provides a density current baffle that employs a baffle that is dimensioned to balance the fact that larger horizontal projections of density current baffles improve performance while simultaneously recognizing that an overly large baffle would simply not correctly function, be unnecessarily large and complex and may in fact have a negative impact on the otherwise ordinary operation of flows within the clarifier tank. Thus, the present arrangement provides a baffle that improves performance while satisfying the desire to remain conservative in defining an upper limit for the projection.

To this end, the horizontal projection of the baffle is structured according to the following equation:

HP=24"+0.4 inches/foot×(Diameter−30)

With this arrangement for density current baffles, the minimum baffle size is 24 inches. A horizontal projection for a 100-foot clarifier produced by this method is 52 inches (versus 39 Inches using the designs of the prior art). Such an arrangement provides up to a 10% improvement in performance over prior art baffle (in reduction in solids reaching the launder channel). Table 1.0 below compares the horizontal projection produced using the current method and NEFCO's method.

The improvement in baffle performance (solids capture) was 5% to 10% or more depending on the size (diameter) of the tank. Expressed as a percentage of tank diameter, the current arrangement uses a projection that ranges from 7% in smaller clarifiers to 4% in large clarifiers, with baffle performance consistently better than that using projections as per the prior art construction.

The present method for determining the horizontal projection of the baffle is independent of the inclination angle, but is most effective when used with a 30° Inclination (from down from horizontal—or 60° up from vertical) angle. This angle has been shown to be more effective at solids capture than the prior art 45° angle. An added benefit lies in the fact that the hypotenuse of any resulting baffle is significantly shorter than its 45° counterpart and therefore less expensive to produce.

Table 1.0 Comparison of the Horizontal Projection (HP) under the current arrangement in comparison with prior art projections.

TABLE 1

| HP = 18" + 0.3(D−30) | | HP = 24" + 0.4(D−30) | |
|---|---|---|---|
| Diameter (Ft) | Projection (in) | Diameter (Ft) | Projection (in) |
| 30 | 18 | 30 | 24 |
| 40 | 21 | 40 | 28 |
| 50 | 24 | 50 | 32 |
| 60 | 27 | 60 | 36 |

TABLE 1-continued

| HP = 18" + 0.3(D-30) | | HP = 24" + 0.4(D-30) | |
|---|---|---|---|
| Diameter (Ft) | Projection (in) | Diameter (Ft) | Projection (in) |
| 70 | 30 | 70 | 40 |
| 80 | 33 | 80 | 44 |
| 90 | 36 | 90 | 48 |
| 100 | 39 | 100 | 52 |
| 110 | 42 | 110 | 56 |
| 120 | 45 | 120 | 60 |
| 130 | 48 | 130 | 64 |
| 140 | 51 | 140 | 68 |

In another embodiment, the present arrangement takes into account two other factors that affect baffle performance, namely flow rate through the clarifier and the distance between the top of the sludge blanket and the bottom of the baffle.

In one arrangement, the present baffle with a 30 degree inclination (downward from the horizontal or 60 degree upward from the vertical) combined with the extended horizontal projection above, advantageously provide an improving performance as flow rate within the clarifier tank increases.

Moreover, the location of the present baffle relative to the sludge blanket is arranged such that the distance from the top of the blanket to the lower, inboard (center) tip of the baffle, measured vertically, is substantially four feet. This arrangement provides the minimum space necessary for the baffle to intercept and deflect the density currents without creating a "short-circuit" to the launder flow.

Accurately defining the vertical location of the baffle on the wall of the clarifier is difficult because the sludge blanket depth is not fixed and may vary over time. In clarifiers with adequate side water depth, it is best to position the bottom of the baffle midway between the bottom of the weir and the "average" blanket height, or four to six feet above the blanket. In clarifiers that lack sufficient depth, it may be necessary to reduce the horizontal projection of the baffle (and with it, the vertical height of the baffle) to fit the baffle into the space available. In the present arrangement, given the above conditions, the baffle is positioned such that the sludge blanket does not ride up over the baffle.

In another arrangement, in clarifiers with inboard launders, the baffle is usually mounted to the lower inboard corner of the launder trough. It is generally assumed that the bottom of the launder acts as a baffle in intercepting those density currents that rise up the tank wall, while the density current baffle acts to deflect those currents that emerge from beneath the launder down and away from the launder. The present baffle mounted to the launder reduces effluent solids by 15% to 20% over clarifiers with inboard launder and no baffle.

In the case where a baffle is mounted to the launder channel and not the side wall of the clarifier tank, the horizontal projection of a launder-mounted baffle is calculated as though the baffle is to be mounted to the tank wall, and then the width of the launder is subtracted to determine the required projection of the baffle, but in any case with a minimum projection of 24".

To this end, the present arrangement is directed to a baffle system in a clarifier tank having a tank bottom, a periphery and a substantially vertical peripheral wall bounding the interior of the tank, the tank having an effluent channel.

The baffle system has a plurality of baffles mounted on the clarifier tank, where each baffle has a baffle surface with a lower end and an upper end. The upper end of the baffle surface is coupled to a wall of the clarifier tank. The lower end of the baffle surface is disposed at a substantially 60° angle away from the side wall of the clarifier tank such that the baffle surface slopes downwardly and away from the side wall, where the horizontal projection of the baffle into the center of the tank is determined using the following equation:

$$HP = 24" + a(D-30)$$

D=diameter of the tank in feet;
a=coefficient multiplier
with the coefficient "a" is set to 0.4 inches per foot or greater.

BRIEF DESCRIPTION OF THE DRAWINGS

The present invention can be best understood through the following description and accompanying drawings, wherein.

DETAILED DESCRIPTION

Figure 1:
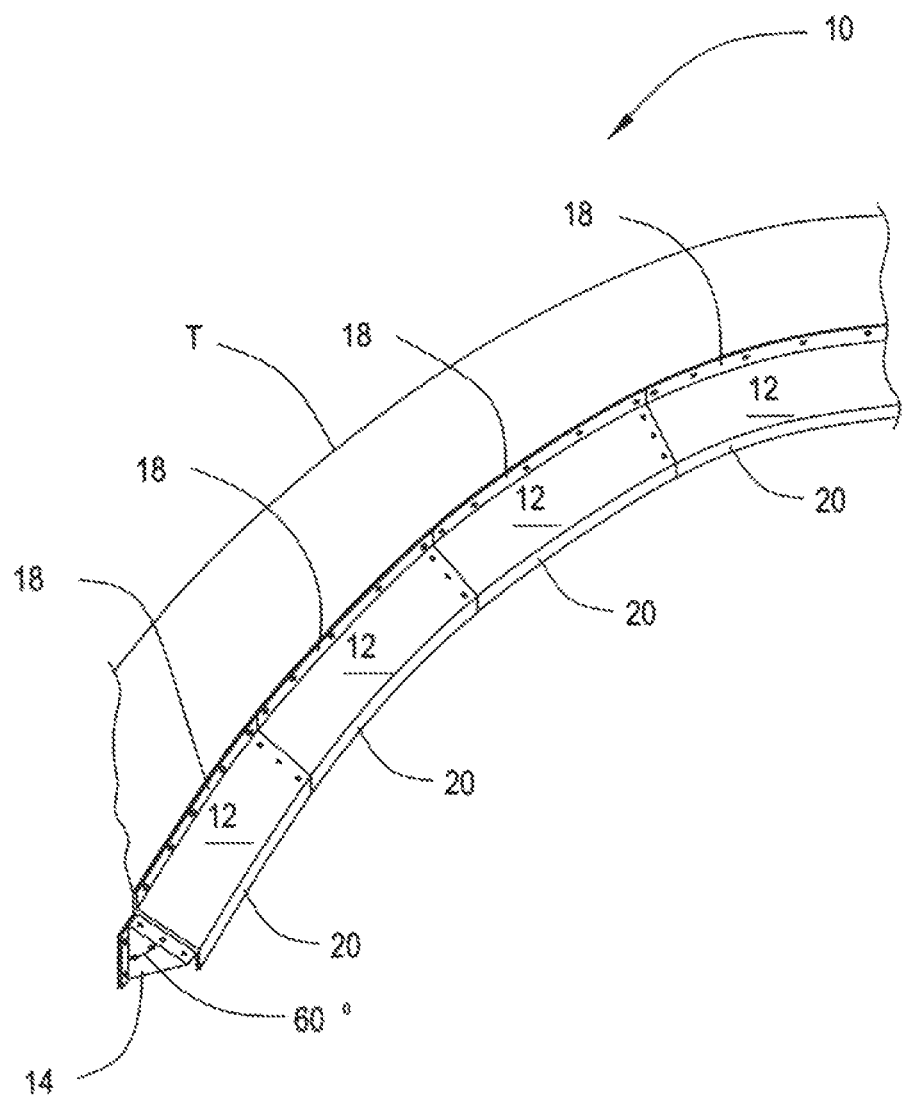
FIG. 1 shows a clarifier tank and density current baffle in accordance with one embodiment.

In one arrangement, as shown in FIG. 1, a density current baffle 10 is shown attached to a tank wall T. Density current baffle 10 is made from a plurality of connected baffle surfaces 12, each of which forming a portion of baffle 10 about the circumference of tank wall T.

Bracket elements 14 are positioned under baffle surfaces 12, preferably at the connection points between adjacent baffle surfaces as shown in FIG. 1. In one arrangement, an upper mounting flange 18 is located at the top edge of each of baffle surfaces 12 for coupling baffle surfaces 12 to tank wall T. Also as shown in FIG. 1, an end flange 20 projects downward from each of baffle surfaces 12, substantially perpendicular to tank wall T. Bracket element 14 and baffle surfaces 12 can be molded as a one piece fiberglass baffle.

Figure 2:
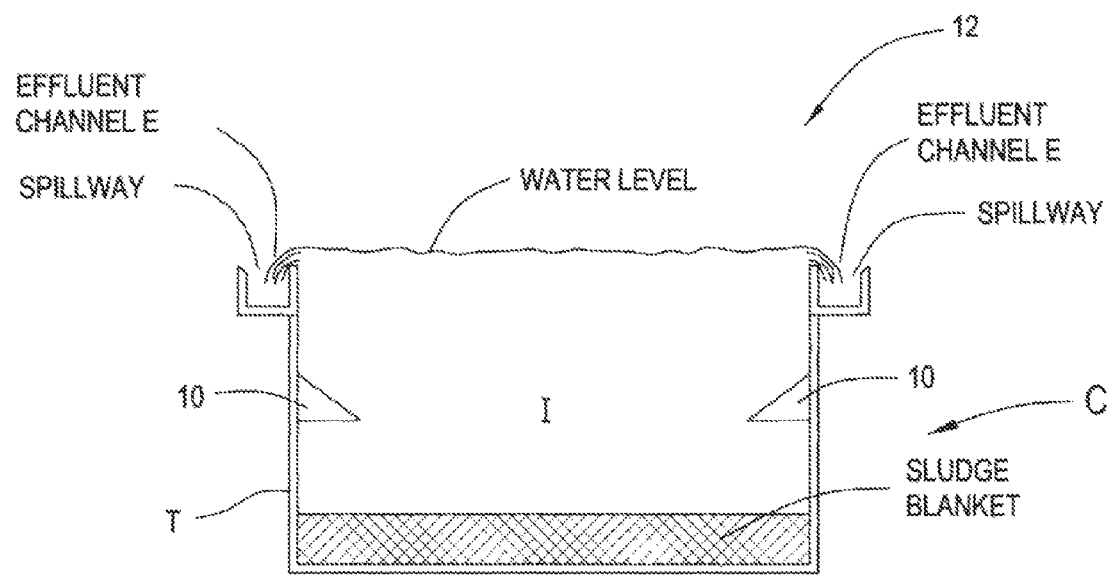
FIG. 2 shows the density current baffle within a clarifier tank in cross section view, in accordance with one embodiment.

FIG. 2 shows a cut away view of baffle 10 within a typically circular type clarifier tank C, having an influent I, tank wall T, a spillway effluent channel and a weir W. Sludge blanket S is shown at the bottom of clarifier tank C, referring to the settled solids.

Figure 3:
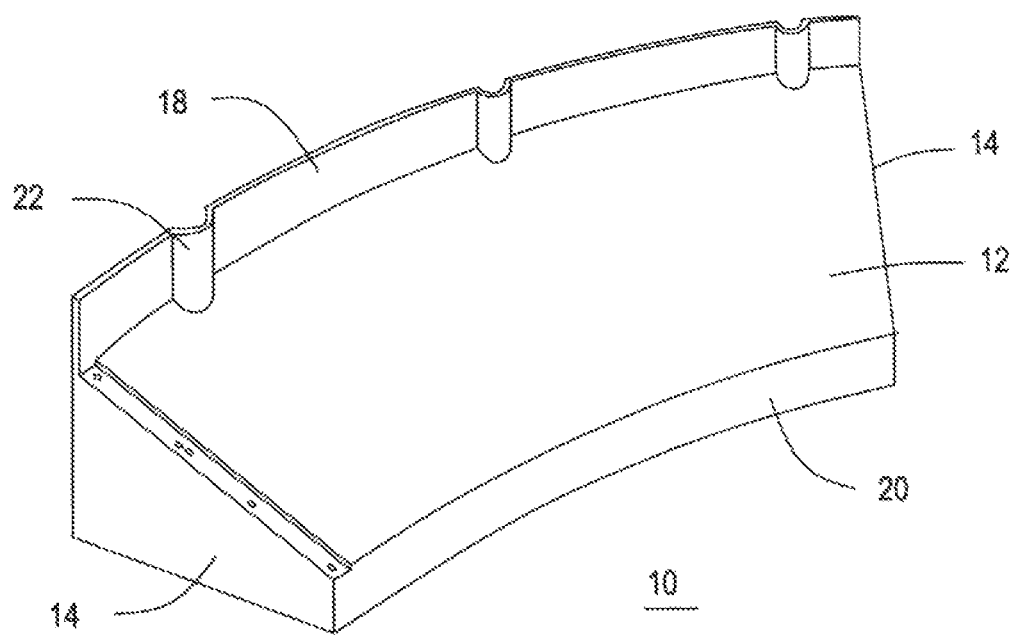
FIG. 3 shows a close up view of a density current baffle surface from FIG. 1 in accordance with one embodiment.

In one embodiment, as shown in FIG. 3, a close up view is shown of a single baffle surface 12 of baffle 10. As shown in FIG. 2, baffle surface 12 may optionally have one or more vent openings 22 located at the top surface. In one arrangement, vents 22 are formed as convex deformations of upper mounting flange 18. As noted above, baffle 10 is configured to prevent solids (in the form of density currents) from flowing upwards and out of the clarifier tank and vents 22 are configured to prevent suspended solids from traveling upwards and out into the effluent channel. However, because of the downward sloping design of baffle surfaces 12, some solids may become trapped, damaging baffle surfaces 12 and possibly reducing their functionality. Vents 22 allow water and solid flow behind baffle surface 12 against tank wall T to prevent the build up of solids.

Using the basic design as set forth above for baffle 10 and baffle surfaces 12, it has been found by the inventor that by implementing certain advantageous arrangements of baffle surfaces 12, including the deflection angle of baffle surfaces 12 from tank wall T, the length of projection of the bottom of baffle surfaces 12 from Tank wall T into the center of tank C and the position of baffle surfaces 12 at certain heights on tank wall T, the relative concentration of solids in the effluent may be substantially reduced over the prior art designs. The following description sets forth the salient features of the baffle 10/baffle surfaces 12 in those respects.

Figure 4:
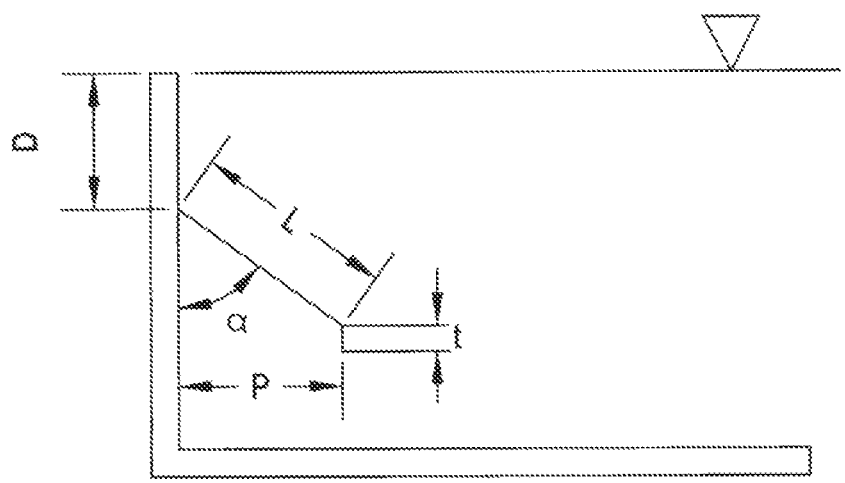
FIG. 4 shows a schematic diagram of the baffle of FIG. 1, in accordance with one embodiment.
Figure 5:
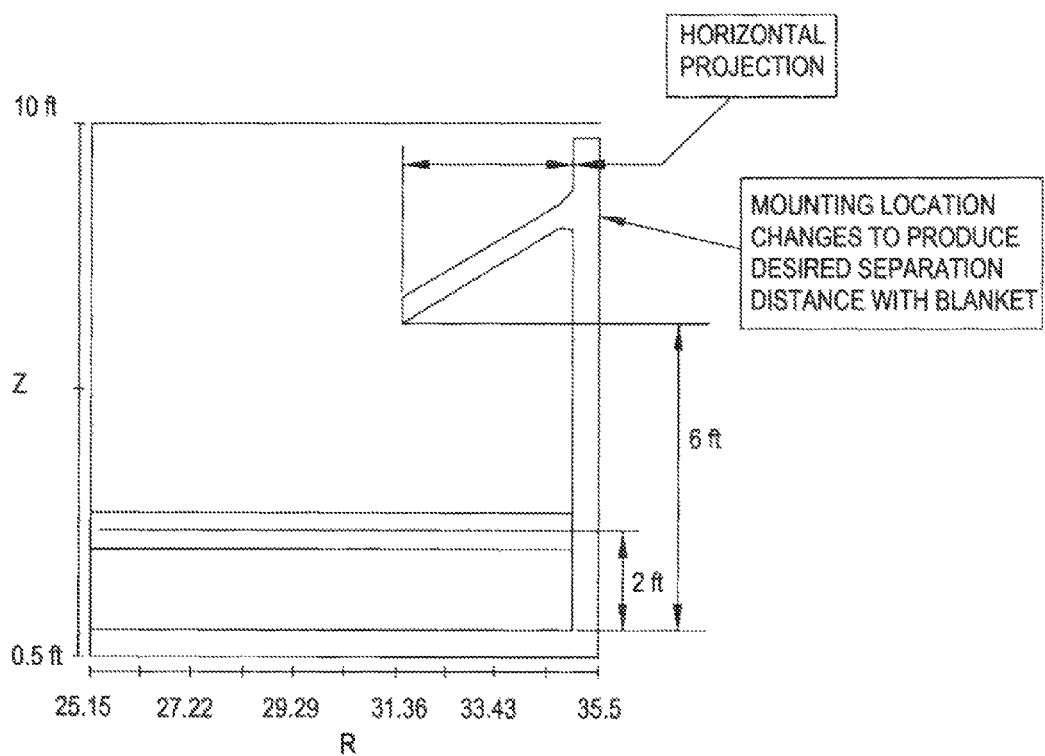
FIGS. 5-8 show exemplary test arrangements for the present baffle in various sized clarifier tanks with different sludge blanket conditions.
Figure 6:
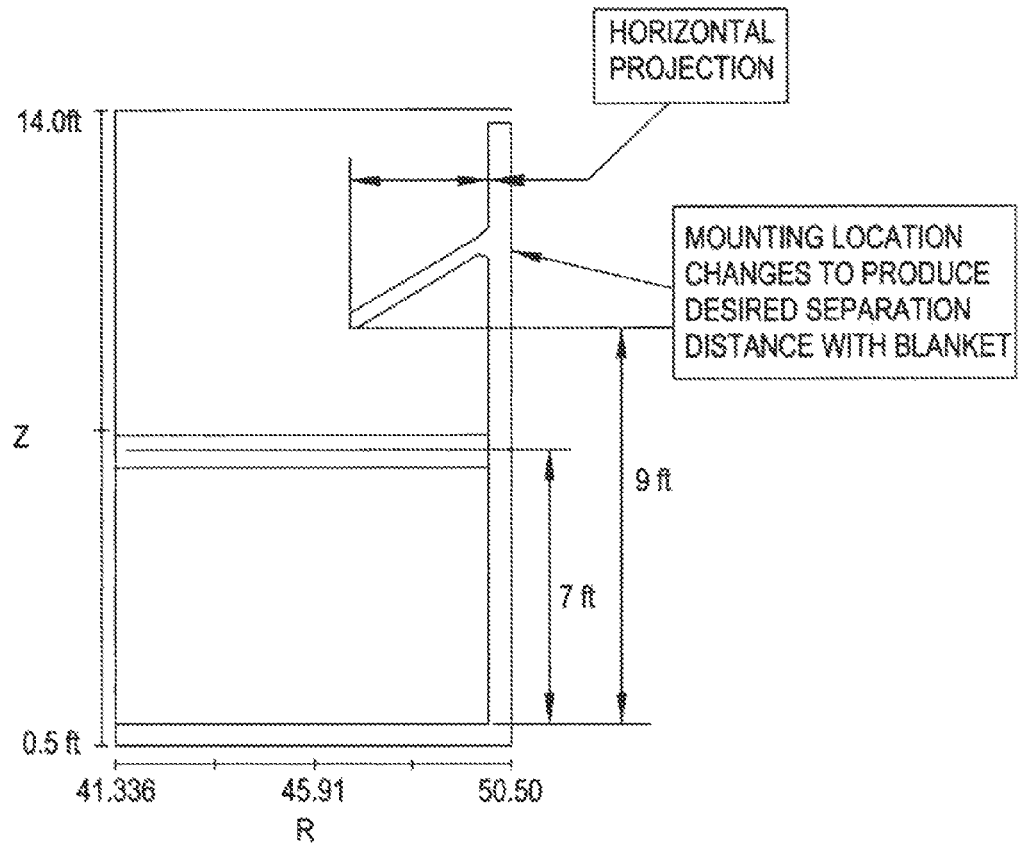

As shown in FIG. 4, a schematic drawing is shown having various variables for the measurements associated with the size and positioning of baffle surfaces 12.

D=distance from weir (water level)
L=Length of baffle surface 12
α=angle from wall T
t=size of end flange
P=Projection distance from wall T (based on α and L)

It is noted that the desired minimum horizontal projection is ideally based on the following equation(s)
Or in English Units Minimum Horizontal Projection=24+α(d [ft]−30), Where Horizontal Projection is in inches
α=0.4 inches per foot, and
d=tank diameter in feet In view of the above, an exemplary series or modeling tests were performed to simulate sample baffles (of similar basic design to baffle 10 but with varying dimensions) performance in an exemplary clarifiers C of varying dimensions (e.g. from 70-140 ft diameter), with varying levels of sludge blanket (e.g. from 2-4 foot depth), and with varying distances of baffle tip to sludge blanket (e.g. from 6-10 feet).

Such simulations were carried out for clarifiers with diameters ranging between 70 ft and 140 ft. As shown in the following Table 1, all of the clarifiers were geometrically similar. FIGS. 5 through 8 show typical setups for clarifiers with diameters equal to 70 ft, 100 ft, and 140 ft.

TABLE 1

| Diameter (ft) | Side Water Depth (ft) | Sludge Blanket Depth (ft) | Distance to Tip of Baffle from Bottom of Clarifier (ft) |
| --- | --- | --- | --- |
| 70 | 10 | 2 | 6 |
| 80 | 11.3 | 2.3 | 6.3 |
| 90 | 12.6 | 2.6 | 6.6 |
| 100 | 14 | 3 and 7 | 7 and 9 |
| 110 | 15.5 | 3.25 | 7.75 |
| 120 | 17.0 | 3.5 | 8.5 |
| 130 | 18.5 | 3.75 | 9.25 |
| 140 | 20 | 4 | 10 |

Using such basic arrangements discussed above, the following table 2 shows nine different high blanket simulations carried out using the 100 ft diameter clarifier setup shown in FIG. 2. This is a first set of test scenarios that uses a high blanket scenario.

TABLE 2

High Blanket (7.0 ft Deep)

| Case Number | Horizontal Projection (inches) | Width (inches) | SOR (gpd/ft2) | Distance between Baffle Tip and Blanket (ft) |
| --- | --- | --- | --- | --- |
| 1 | 39 | 45 | 900 | 2.0 |
| 2 | 46 | 53 | 900 | 2.0 |
| 3 | 53 | 61 | 900 | 2.0 |
| 4 | 60 | 69 | 900 | 2.0 |
| 5 | 46 | 53 | 900 | 1.7 |
| 6 | 53 | 61 | 900 | 1.3 |
| 7 | 46 | 53 | 900 | 2.3 |
| 8 | 53 | 61 | 900 | 2.3 |
| 9 | 60 | 69 | 900 | 2.3 |

The results of the simulations are shown below in Table 3 (note: relative effluent concentrations have been normalized against the results of scenario 1).

TABLE 3

High-Blanket Study Results

| Case Number | Horizontal Projection (inches) | Distance between Baffle Tip and Blanket (inches) | Relative Effluent Conc. |
| --- | --- | --- | --- |
| 1 | 39 | 2.0 | 1 |
| 2 | 46 | 2.0 | .98 |
| 3 | 53 | 2.0 | .97 |
| 4 | 60 | 2.0 | 1.2 |
| 5 | 46 | 1.7 | 2.3 |
| 6 | 53 | 1.3 | 2.5 |
| 7 | 46 | 2.3 | 1.3 |
| 8 | 53 | 2.3 | 1.6 |
| 9 | 60 | 2.3 | 1.9 |

Figure 9:
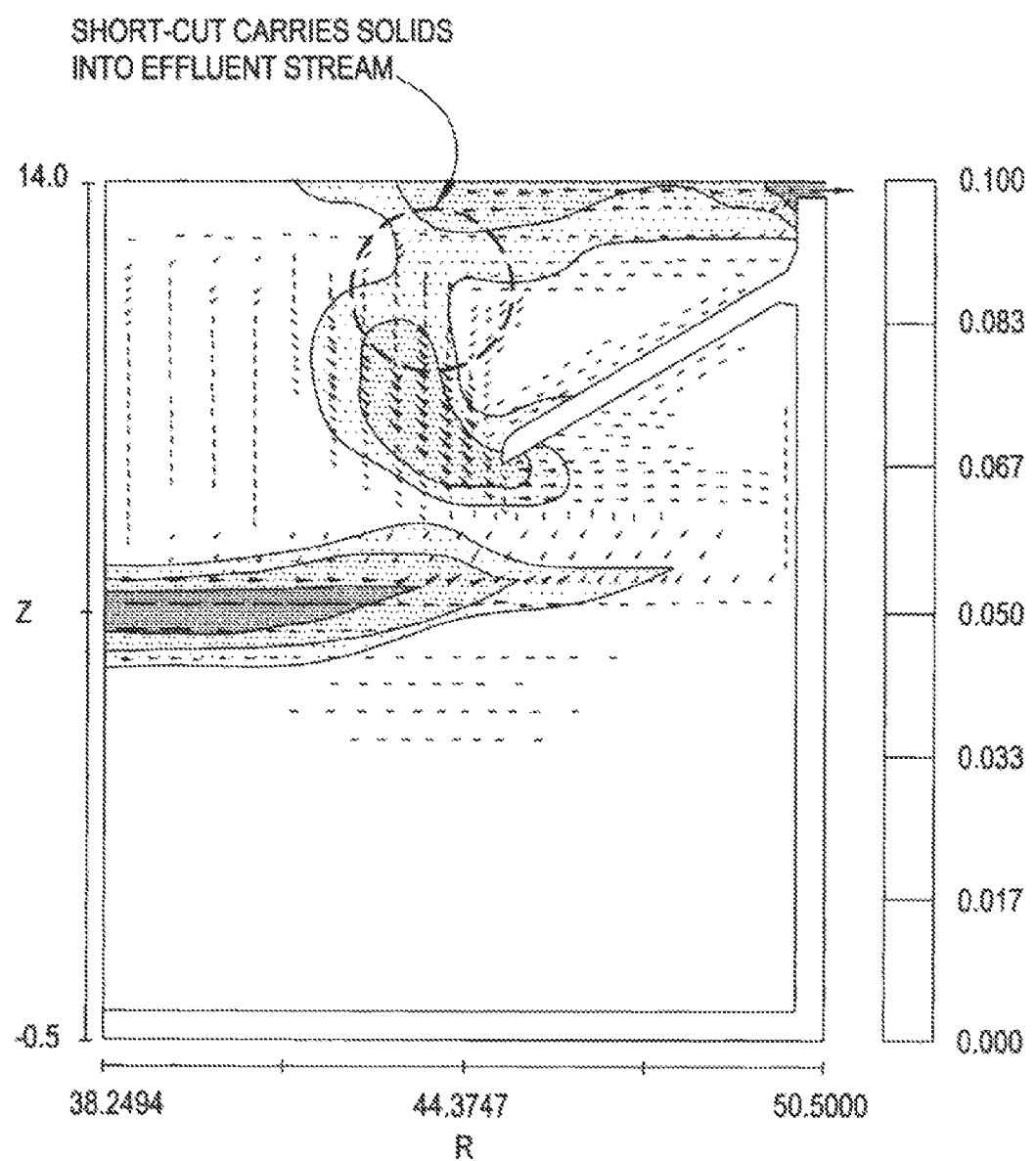
FIGS. 9-12 show various flow test measurements for the arrangements of FIGS. 5-8.

According to the results shown above in table 3, increasing baffle projection alone does not necessarily reduce the solids concentration in the effluent entering the launder channel. This may be due to the fact that increasing the horizontal projection of the baffle also increases its vertical dimension and positions the bottom of the baffle too close to the top of the sludge blanket. The space available between the blanket and baffle does not allow the baffle to adequately deflect the current-born solids. For example, FIG. 9 shows the results of a calculation where the projection of a baffle has been increased from 39 Inches to 60 inches and the baffle has been positioned 2.3 ft above the blanket (4 inches higher than the standard position in this case). With these changes made, the baffle successfully deflects the density current, but a short-circuiting current forms around the tip of the baffle and more solids are carried into the effluent stream (for this case solids concentrations were about twice what they were for the benchmark case). The "short circuit" may be characterized as a circular eddy of solids that, rather than being deflected towards the center of the tank actually curl around up over the density current baffle.

Figure 10:
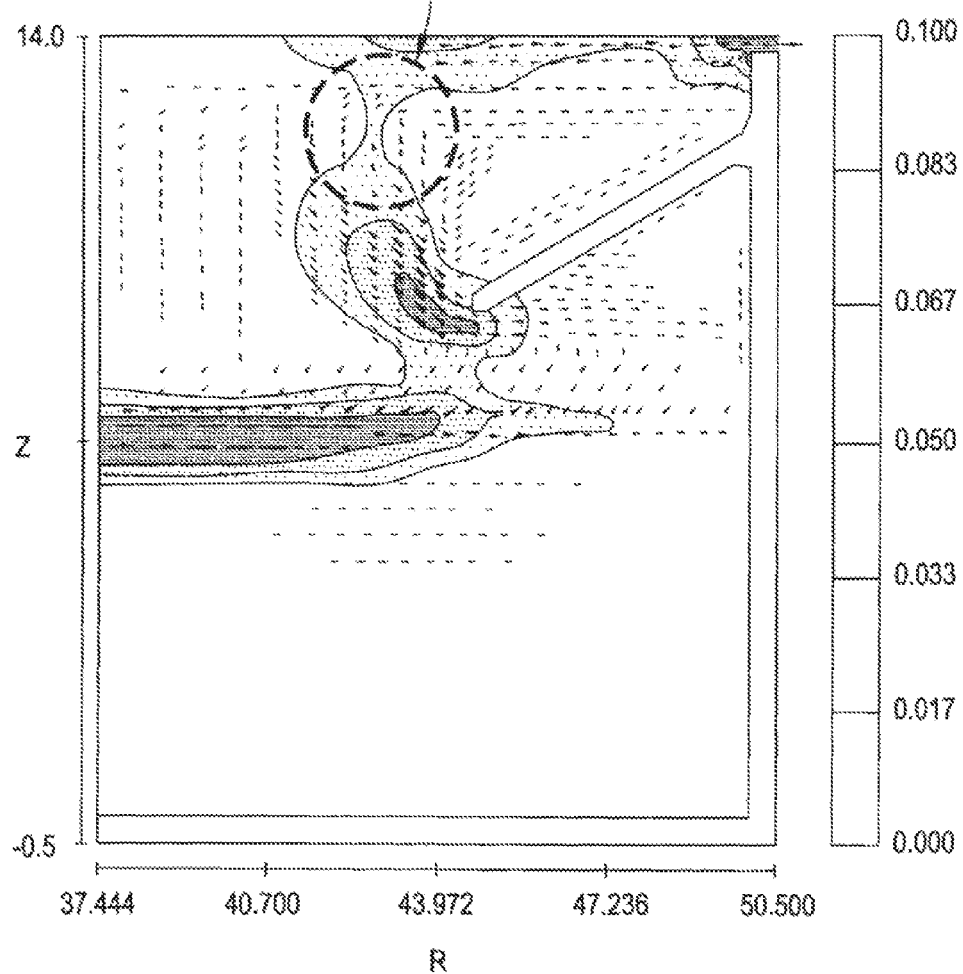

With hopes of eliminating the short-circuiting current in FIG. 9, the baffle was lowered 4 Inches vertically as shown in FIG. 10. In this scenario, the short-circuiting current is weakened, however, about 20% more solids are still carried into the launder than in the benchmark case.

Figure 11:
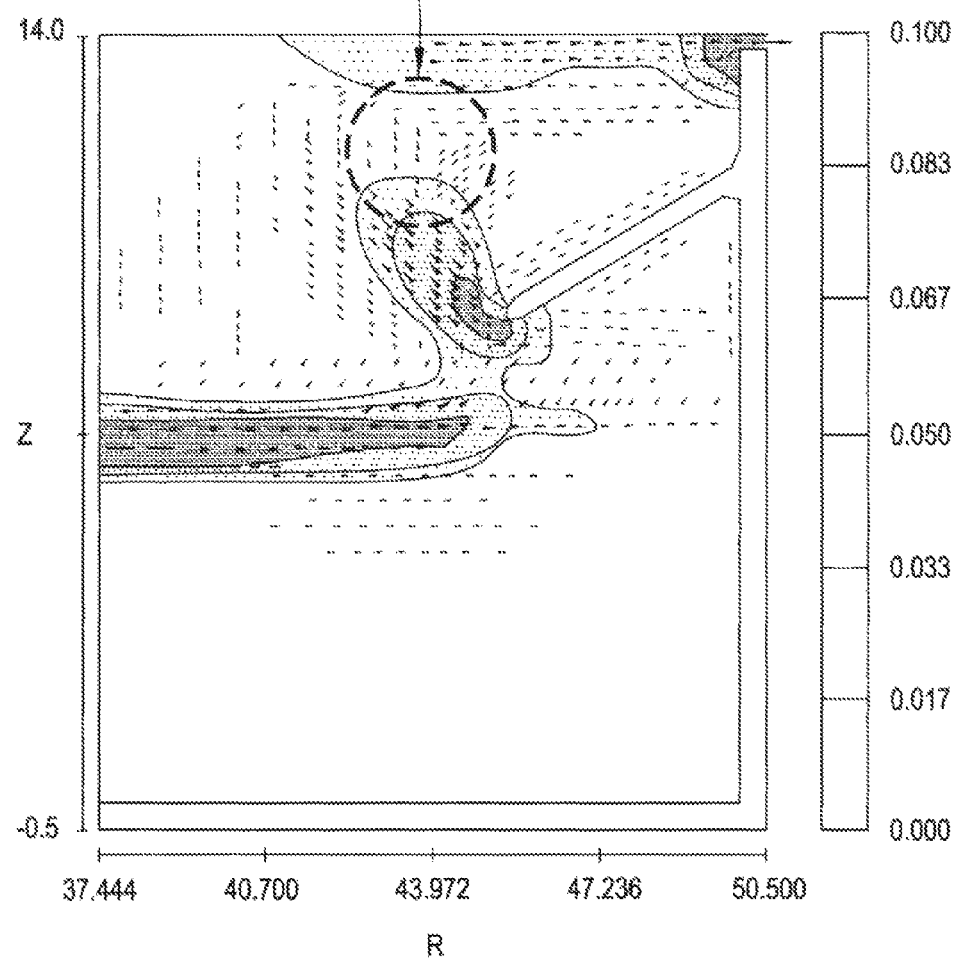

To break the short-circuiting current, the projection of the baffle was reduced from 60 inches to 53 Inches as shown in FIG. 11. This change finally reduced effluent solids concentration to values that are similar to the benchmark case.

Figure 12:
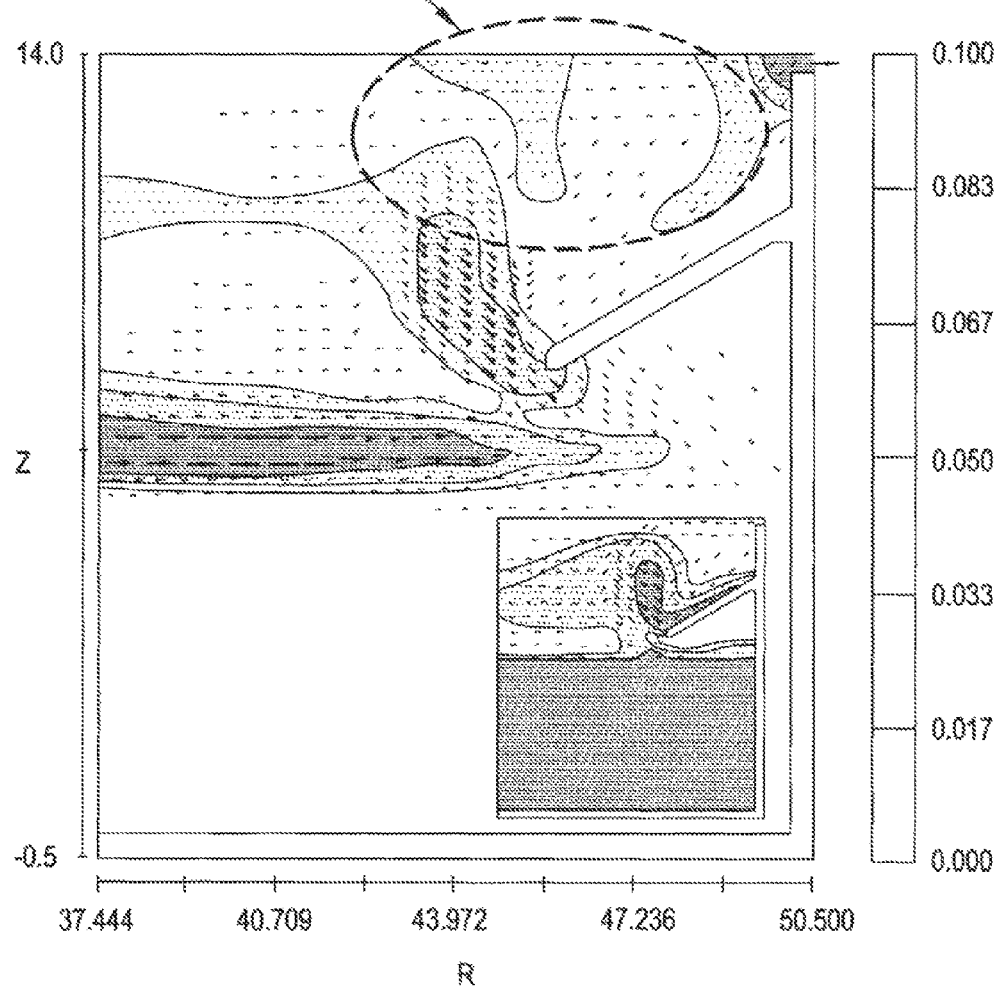

The results for case numbers 4, 7, 8, and 9 indicate that upper limits for baffle placement exist and that a shorter baffle can sometimes work better than a longer one for conditions where limited space is available for baffle placement. In contrast to this, the results of case numbers 5 and 6 show that lower limits for baffle placement also exist (refer to FIG. 12 where the results of case 6 are shown—here solids are literally plowed up by the baffle and effluent solids concentrations are increased).

In summary, the high blanket scenarios characterize, somewhat atypical, worst-case conditions for baffle sizing, and the best baffle size for this condition is essentially dictated by the space available for its placement with the ideal scenario tested being case 3 of Table 3 shown in FIG. 11.

TABLE 4

Low Blanket (3.0 ft deep)

| Case Number | Horizontal Projection (inches) | Width (inches) | SOR (gpd/ft2) | Distance between Baffle Tip and Blanket (ft) |
|---|---|---|---|---|
| 1 | 39 | 45 | 900 | 4.0 |
| 2 | 46 | 53 | 900 | 4.0 |
| 3 | 53 | 61 | 900 | 4.0 |
| 4 | 60 | 69 | 900 | 4.0 |

Figure 7:
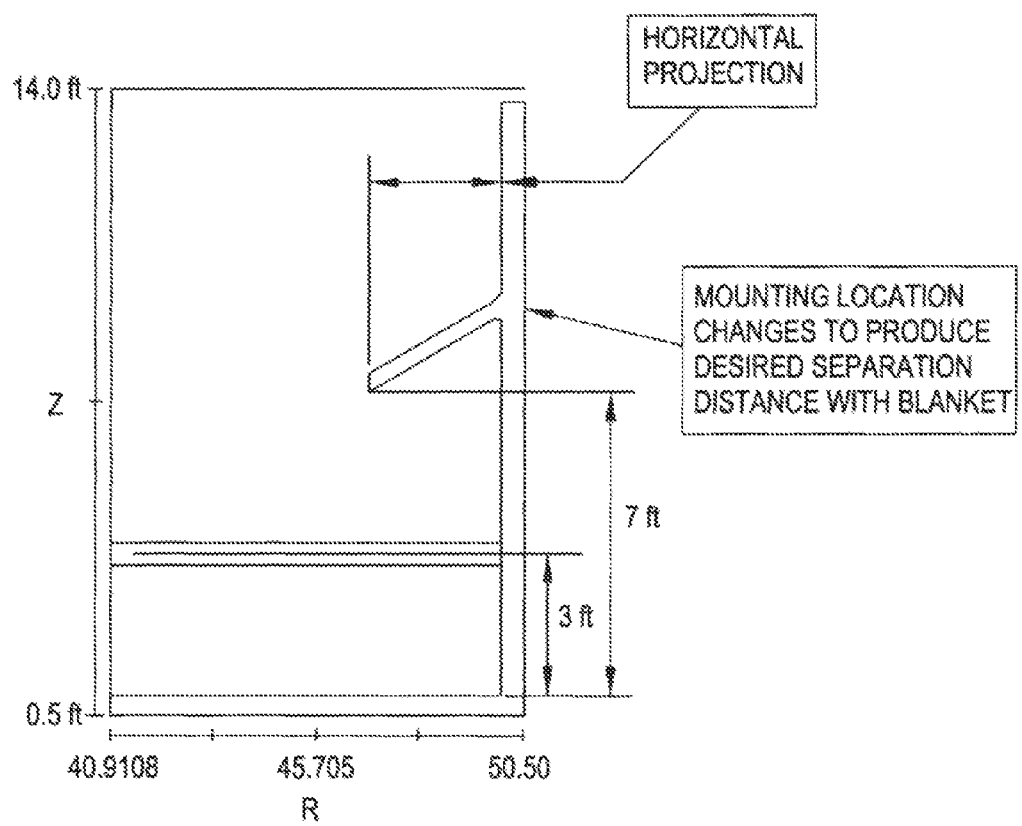
Figure 8:
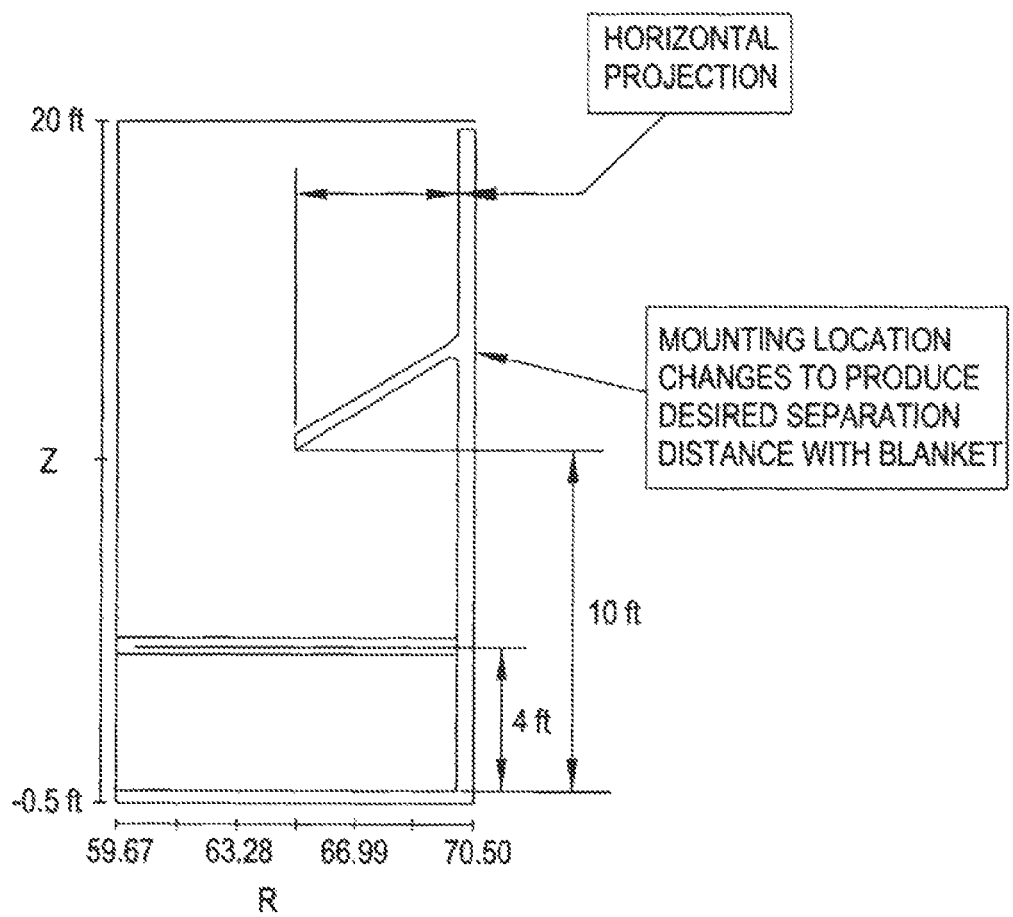

In a next series of testing the present arrangement was again simulated, as shown in Table 4, using four different low blanket simulations using the 100 ft diameter clarifier setup shown in FIG. 7 (note: the low blanket scenarios represent more typical clarifier operations than the high blanket scenarios do).

The results of these simulations are shown in Tables 5 (note: relative effluent concentrations have been normalized against the Case 1 results).

TABLE 5

Low Blanket Study Results

| Case Number | Horizontal Projection (inches) | Distance between Baffle Tip and Blanket | Relative Effluent Conc. |
|---|---|---|---|
| 1 | 39 | 4.0 | 1 |
| 2 | 46 | 4.0 | .97 |
| 3 | 53 | 4.0 | .95 |
| 4 | 60 | 4.0 | .90 |

The low-blanket study results were somewhat different than the high-blanket study results. In these scenarios, the blanket was only 3.0 ft deep (compared to 7.0 ft in the high blanket study) and the baffle tips were located about 4.0 ft above the blanket at an elevation of 7.0 ft.

Figure 13:
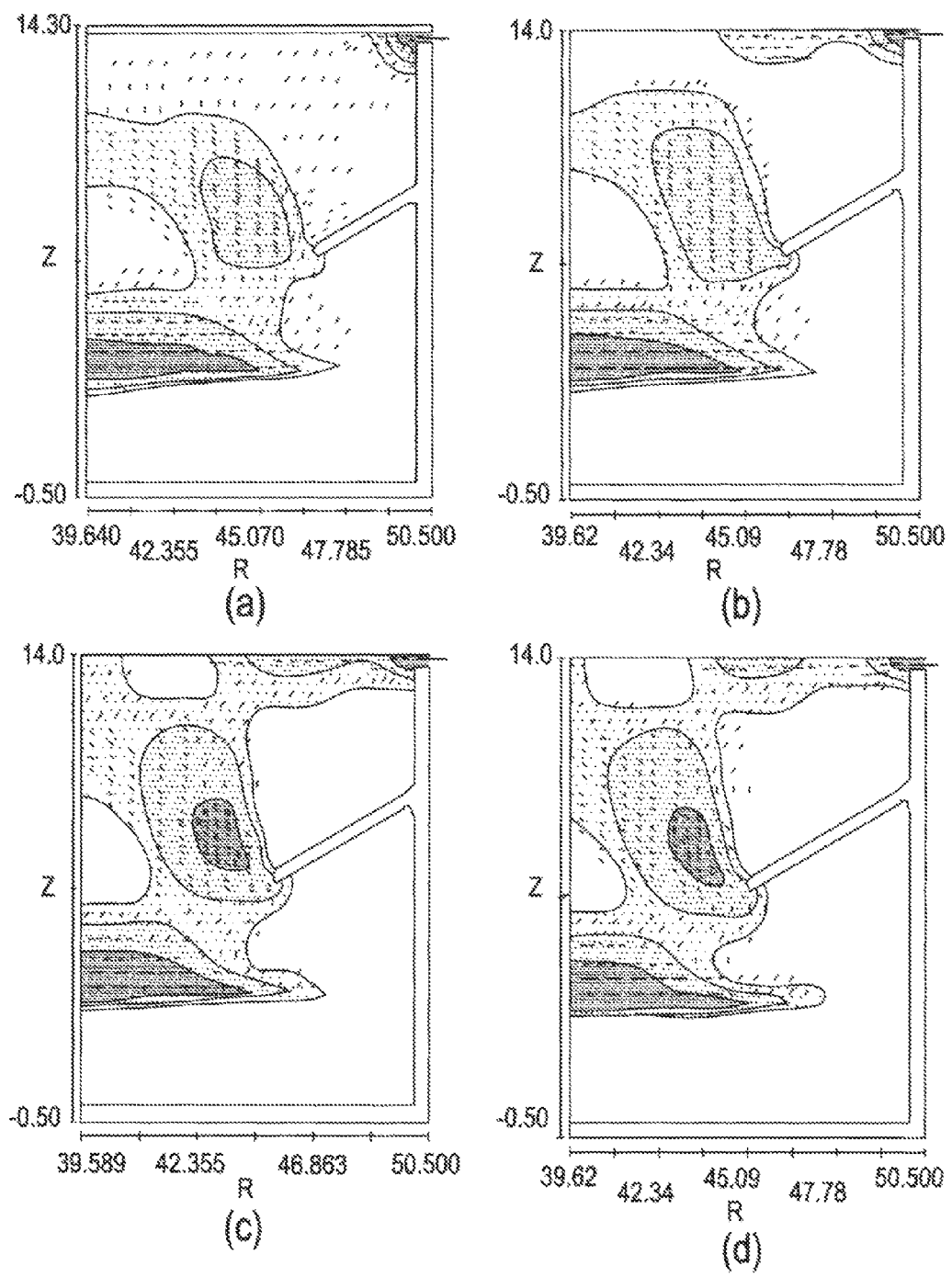
FIGS. 13(a)-(d) show additional flow test measurements testing the present baffle arrangement against other arrangements.
Figure 14:
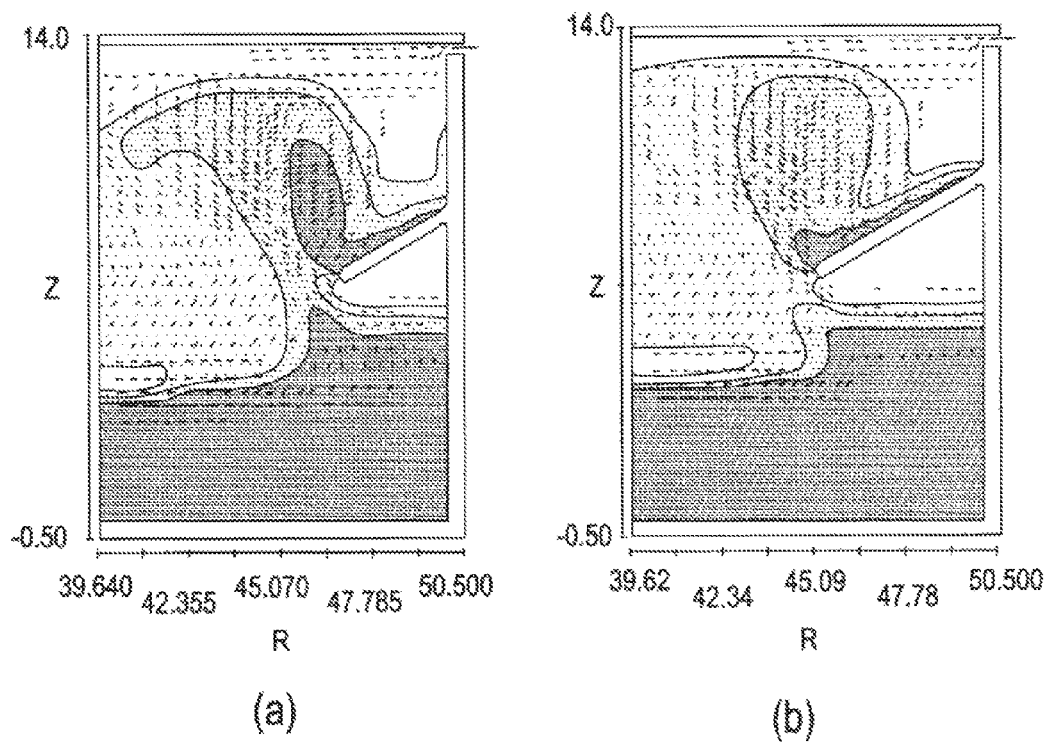
FIGS. 14(a)-(b) show additional flow test measurements testing the present baffle arrangement against other arrangements.

According to the results shown in Table 5, longer baffles reduce effluent solids more than shorter ones do. The maximum improvement was equal to about 10%, and vector plots showing flow around the ends of the baffles in Case Numbers 1 through 4 are all similar. In fact, the flow field shown in FIG. 13(*d*) looks to be more prone to short-circuiting than the flow field in FIG. 13(*a*) does. If one, for example, plots vectors with the field colored by solids concentrations—it becomes clear why the longer baffle is calculated to reduce more effluent solids concentration. As shown in FIG. 14, the longer baffle deflects more solids laden flow towards the center of the clarifier and solids concentrations above the baffle are generally less than they are with the shorter baffle. As a result, the longer baffle is calculated to work better than the shorter one in this case.

In a next series of testing the present arrangement was again simulated, as shown in Tables 6(a) and (b), using the effect of surface overflow rates (SOR) on the performance of the present baffle placed in both 70 ft and 100 ft diameter circular clarifiers. These simulations were carried out for conditions with SOR's equal to 600 and 900 gpd/ft$^2$. As noted in Tables 6(a) and 6(b), eight simulations were completed. Sketches of the setups for these different study scenarios are provided in FIGS. 5 and 7.

TABLE 6(a)

70 ft Clarifier Scenarios

| Case Number | Horizontal Projection (inches) | Width (inches) | SOR (gpd/ft2) | Distance between Baffle Tip and Blanket (ft) |
|---|---|---|---|---|
| 1 | 30 | 35 | 600 | 4.0 |
| 2 | 42 | 48 | 600 | 4.0 |
| 3 | 30 | 35 | 900 | 4.0 |
| 4 | 42 | 48 | 900 | 4.0 |

TABLE 6(b)

100 ft Clarifier Scenarios

| Case Number | Horizontal Projection (inches) | Width (inches) | SOR (gpd/ft2) | Distance between Baffle Tip and Blanket (ft) |
|---|---|---|---|---|
| 5 | 39 | 45 | 600 | 4.0 |
| 6 | 60 | 69 | 600 | 4.0 |
| 7 | 39 | 45 | 900 | 4.0 |
| 8 | 60 | 69 | 900 | 4.0 |

The results of the simulation in case Numbers 1 through 8 are shown in Tables 7(a) and 7(b) below (note: relative effluent concentrations have been normalized against the results of scenarios where a standard horizontal projection was used; i.e., scenarios where the horizontal projections equaled 30 inches or 39 inches).

TABLE 7(a)

100 ft Clarifier

| Case Number | Horizontal Projection (inches) | SOR (gpd/ft2) | Distance between Baffle Tip and Blanket (ft) | Relative Effluent Conc. |
|---|---|---|---|---|
| 1 | 30 | 600 | 4.0 | 1 |
| 2 | 42 | 600 | 4.0 | .99 |
| 3 | 30 | 900 | 4.0 | 1 |
| 4 | 42 | 900 | 4.0 | .98 |

TABLE 7(b)

100 ft Clarifier

| Case Number | Horizontal Projection (inches) | SOR (gpd/ft2) | Distance between Baffle Tip and Blanket (ft) | Relative Effluent Conc. |
|---|---|---|---|---|
| 5 | 39 | 600 | 4.0 | 1 |
| 6 | 60 | 600 | 4.0 | .92 |
| 7 | 39 | 900 | 4.0 | 1 |
| 8 | 60 | 900 | 4.0 | .90 |

According to the 70 ft clarifier study results (Table 7[a]) increasing baffle projection reduces effluent solids concentration slightly, and the reduction of effluent solids is greater for an SOR equal to 900 than it is for an SOR equal to 600.

Figure 15:
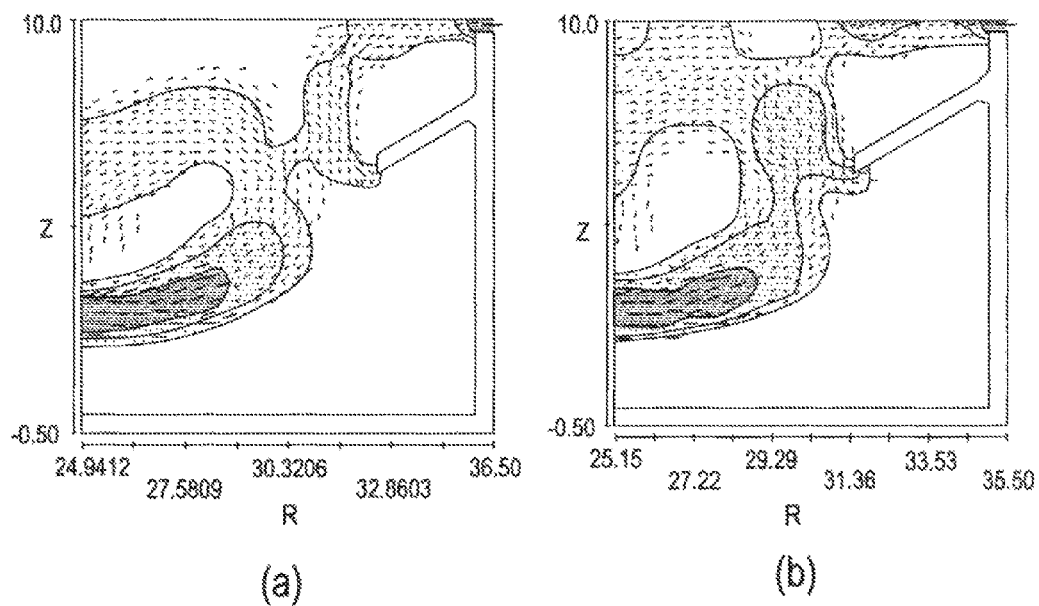
FIGS. 15(a)-(b) show additional flow test measurements testing the present baffle arrangement against other arrangements.

FIG. 15 shows the results of case numbers 3 and 4 where the field is colored by flow speed. As shown, the longer baffle (right frame) produces a stronger return current; however, the resulting flow pattern reduces effluent solids concentrations only slightly. Similar results were obtained for case numbers 1 and 2, where the SOR was equal to 600, but the results were less dramatic.

According to the results shown in Table 7(b), longer baffles in the 100 ft clarifier reduce effluent solids more than shorter ones do. The percent reduction in effluent solids was calculated to be about 10% maximum.

Figure 16:
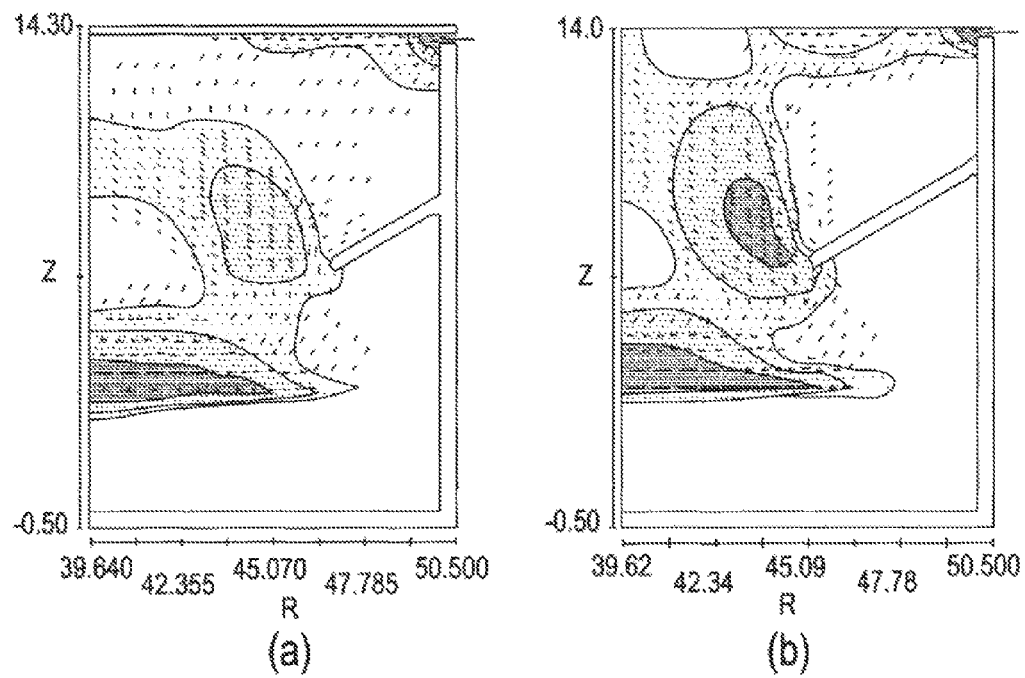
FIGS. 16(a)-(b) show additional flow test measurements testing the present baffle arrangement against other arrangements.
Figure 17:
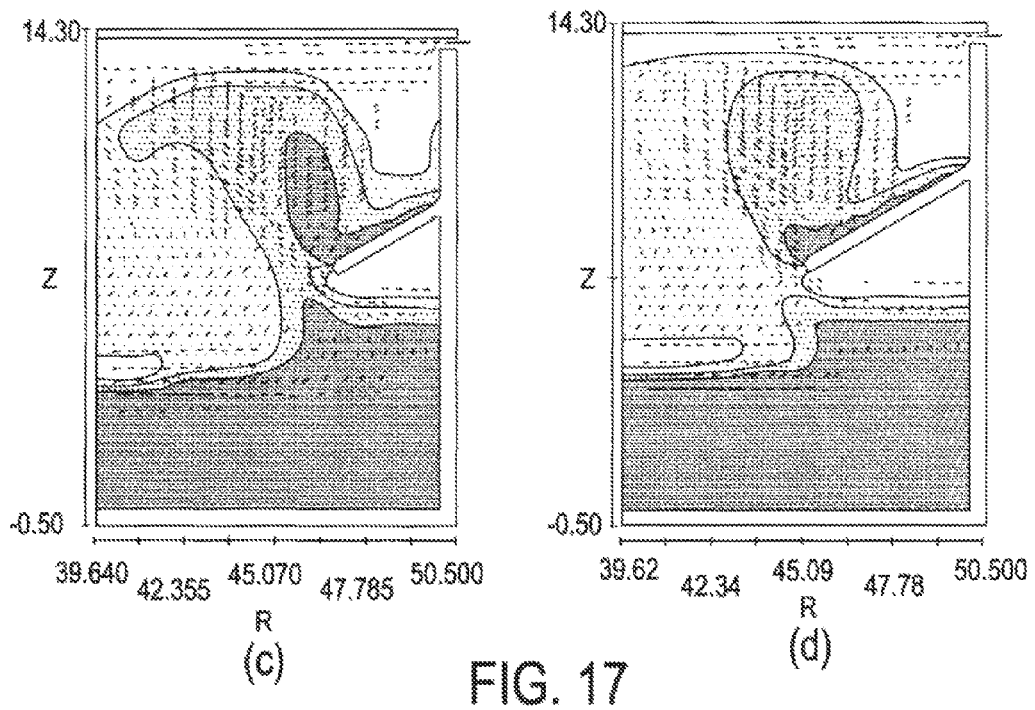
FIGS. 17(a)-(b) show additional flow test measurements testing the present baffle arrangement against other arrangements.

Vector plots showing flow around the end of the baffles in Case Numbers 7 and 8 are shown in FIGS. 16 and 17. As before, the longer baffle is calculated to work better than a shorter one (similar to the results obtained from the 70 ft clarifier simulations).

According to the above results, baffles with greater projections show a better ability to reduce effluent solid concentrations more than prior art baffles with smaller projections over the range of conditions tested. Such results also show that the increased effectiveness is greater in larger clarifiers.

Because the above results indicate that longer baffles work better than those sized according to the current (prior art) formulas—additional testing is done to demonstrate the effectiveness of the present baffle arrangement over the prior art. Simulations were carried out in geometrically similar clarifiers with diameters ranging from 70 ft to 140 ft in increments of 10 ft (refer to Table 1). The baffle projections in each case study were varied, and the relative effluent concentration—compared to a baseline condition for each clarifier diameter—was calculated (the baseline condition corresponded to a setup where the baffle was sized according to the formula currently in use today). Then, for each clarifier diameter, the horizontal projection associated with the baffle that reduced effluent solids concentration the most was identified. This data was then plotted and used to develop a new equation for baffle sizing.

The results of modeling in 70 ft, 100 ft, and 140 ft clarifiers are provided in the following sections. The results of modeling carried out in clarifiers with other diameters are not presented; however, the results of the analyses are similar. That is, in all cases, effluent solids concentration was reduced when baffle projection was increased and then at some point the results became inconsistent (i.e., effluent solids concentration was calculated to rise and fall erratically). On the basis of this data, the optimum baffle projection was identified for each clarifier and this information was used to derive a new equation for baffle sizing. This demonstrates that the present invention has identified two competing characteristics regarding effluent solid reduction, namely that longer baffles (than the prior art) work better, but at a certain length and inclination cause circular short circuiting currents.

Figure 18:
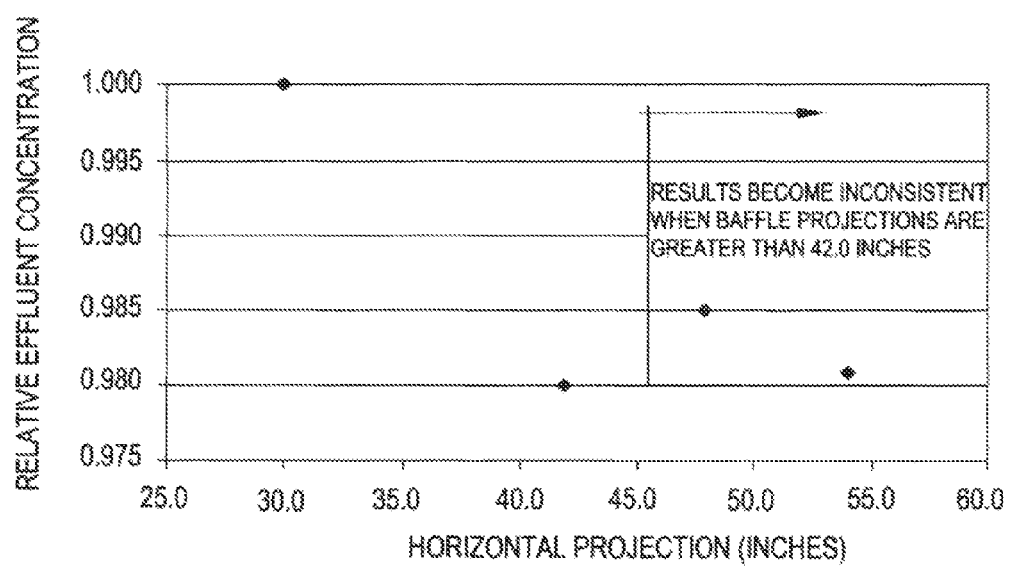
FIG. 18 is a graph showing effluent concentration variation over horizontal baffle projections.

Table 8 and FIG. 18 show results of clarifier modeling carried out in a 70 foot clarifier operating with an SOR of 900.

TABLE 8

Study results - 70 foot clarifier

| Horizontal Projection (inches) | Relative Effluent Conc. |
|---|---|
| 30 | 1 |
| 42 | .98 |
| 48 | .99 |
| 54 | .98 |

Figure 19:
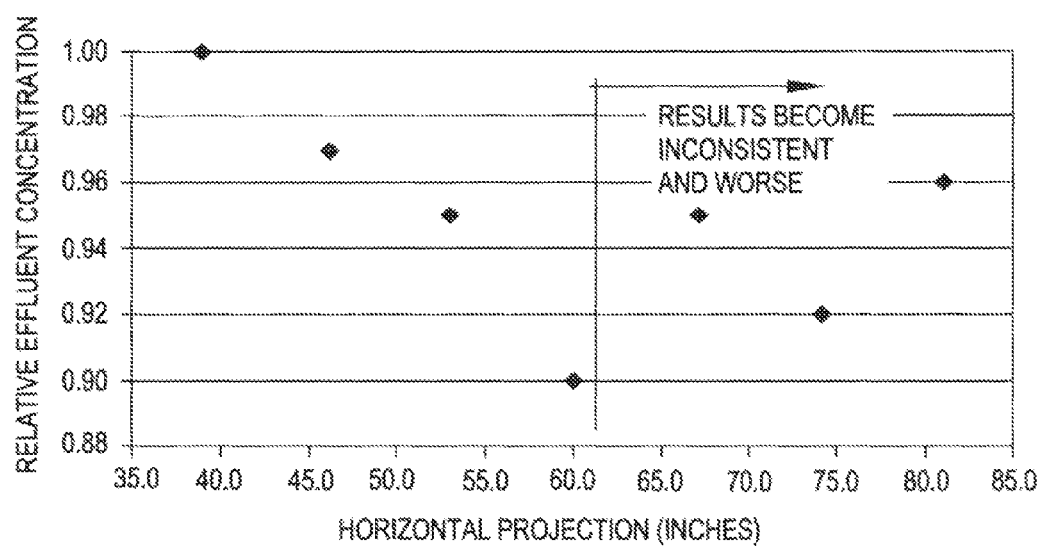
FIG. 19 is a graph showing effluent concentration variation over horizontal baffle projections.

Table 9 and FIG. 19 show results of clarifier modeling carried out in a 100 foot clarifier operating with an SOR of 900.

TABLE 9 study results - 100 ft clarifier

| Horizontal Projection (inches) | Relative Effluent Conc. |
|---|---|
| 39 | 1 |
| 46 | .97 |
| 53 | .95 |
| 60 | .90 |
| 67 | .95 |
| 74 | .92 |
| 81 | .96 |

Figure 20:
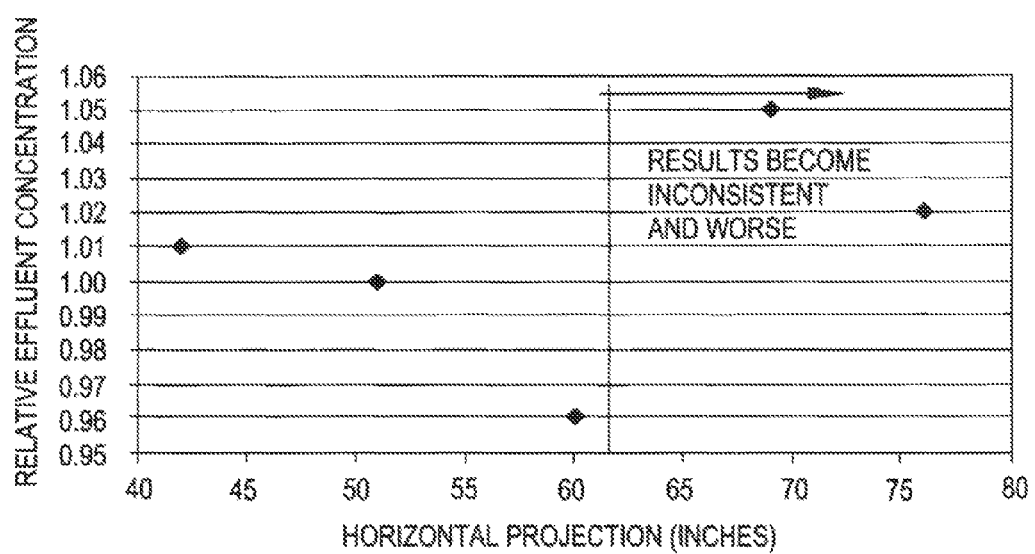
FIG. 20 is a graph showing effluent concentration variation over horizontal baffle projections.
Figure 21:
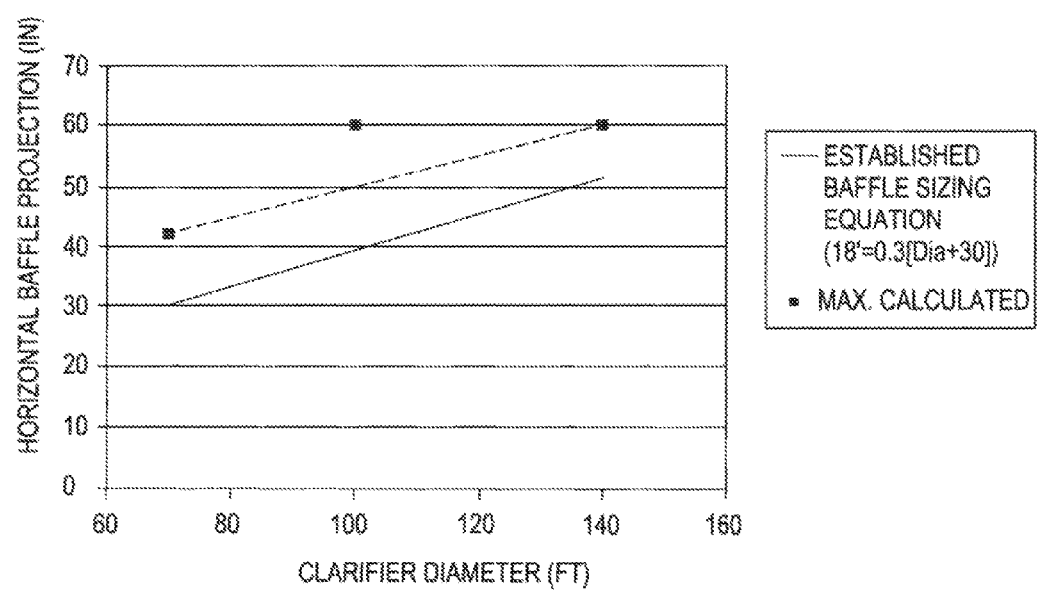
FIG. 21 is a graph showing the prior baffle effectiveness over various clarifier diameters.

Table 10 and FIG. 20 show results of clarifier modeling carried out in a 140 foot clarifier operating with an SOR of 900.

TABLE 10 study results - 140 ft clarifier

| Horizontal Projection (inches) | Relative Effluent Conc. |
|---|---|
| 42 | 1.01 |
| 51 | 1 |
| 60 | .96 |
| 69 | 1.05 |
| 76 | 1.02 |

FIG. 16 shows the results of computations aimed at determining maximum horizontal baffle projection for clarifiers with diameters ranging from 70 ft to 140 ft based on the results presented in sections 4.1 through 4.3. The three points are computed data and the line shows the relationship between clarifier diameter and horizontal projection based on the generally accepted sizing equation below.

Horizontal projections [inches]=18 [inches]+0.3 [Inches/ft]*(clarifier dia. [ft]−30 [ft])

According to the results, effluent solids concentrations are consistently reduced when the horizontal projection of the baffle is increased by as much as 10 inches, regardless of a clarifier's diameter. Projection increases beyond ten inches continue to reduce solids concentrations in larger clarifiers.

Figure 22:
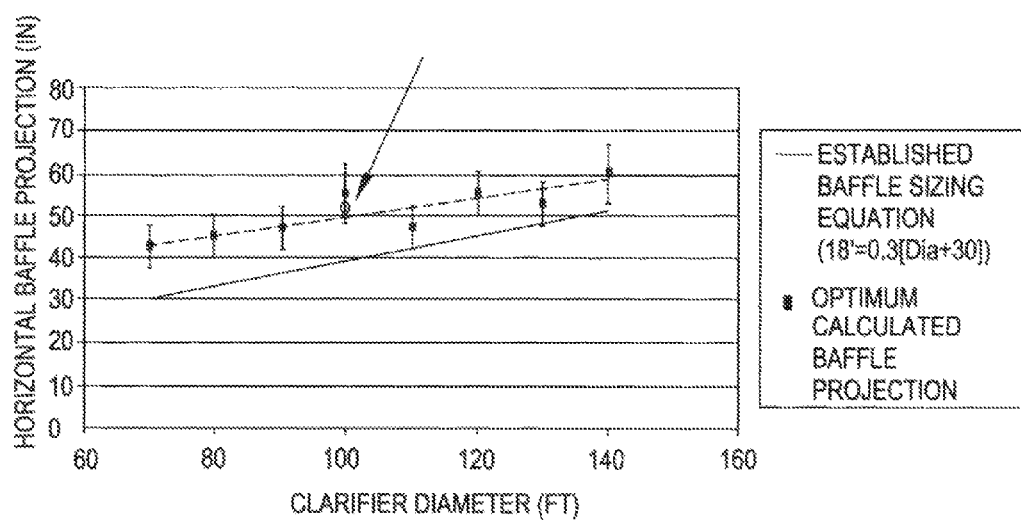
FIGS. 22-23 are graphs showing the present baffle compared to the prior baffle effectiveness over various clarifier diameters.

As discussed above, similar calculations were also carried out for clarifiers with diameters equal to 80 ft, 90 ft, 110 ft, 130 ft and 140 ft. Although the results of those calculations are not presented herein FIG. 22 provides a summary of all of the computed results (Including a representative data point for a simulation where the SOR was equal to 600—note: the error bars show the difference between successive trials with baffles whose projections are different.

Thus, based on the above testing, it is noted that clarifier performance, in general, benefits from the use of baffles with greater horizontal projections; reduction in effluent solids concentration results from the use of longer baffles; longer baffles reduce effluent solids concentration more during model spin-up (when flows in the clarifiers were increased from 0 to 900 SOR); and, as a limit condition, where the sludge blanket is very high relative to a clarifier's side water depth (SWD) baffle length is essentially dictated by the vertical space available for the baffle to be placed.

As a result, the present arrangement uses a density current baffle that employs the horizontal projection based on the following:

Horizontal projections [inches]=24 [inches]+0.4 [inches/ft]*(clarifier dia. [ft]−30[ft])

Figure 23:
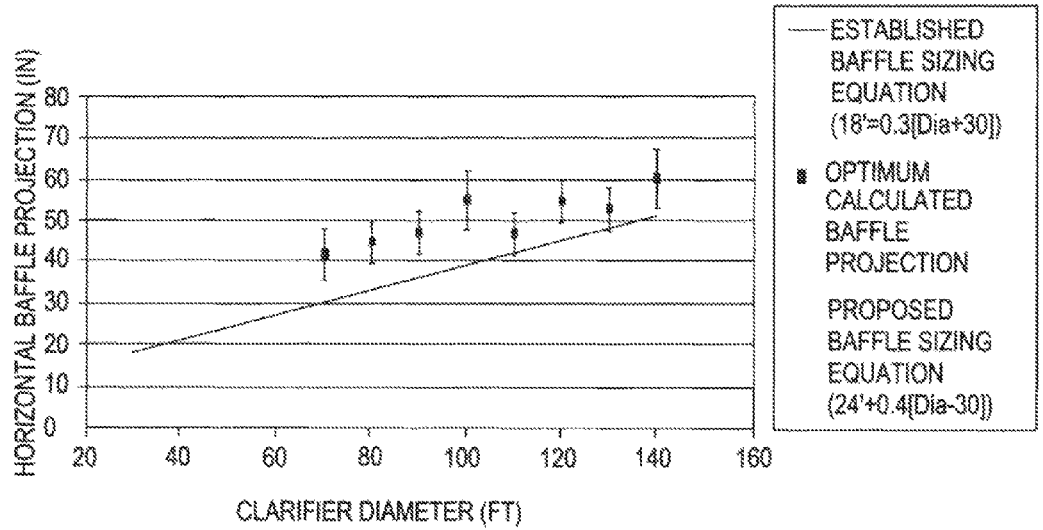

See for example FIG. 23, which compares the prior art baffle system versus the present baffle arrangement.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A baffle system in a clarifier tank having a tank bottom, a periphery and a substantially vertical peripheral wall bounding the interior of the tank, said tank having an effluent channel, said baffle system comprising:
a plurality of baffles mounted on the clarifier tank, each baffle comprising:
a baffle surface, said baffle surface having a lower end and an upper end, the upper end of said baffle surface being coupled to a wall of the clarifier tank, the lower end of said baffle surface being disposed, at an angle away from the side wall of the clarifier tank such that said baffle surface slopes downwardly and away from the side wall, where the horizontal projection of said baffle into the center of the tank is determined using the following equation:

HP=24″+a(D−30)

D=diameter of the tank in feet;
a=coefficient multiplier
with the coefficient "a" is set to 0.4 inches per foot or greater.

2. The baffle system of claim 1, wherein said baffle surfaces, further comprise mounting flanges for securing to said wall of said clarifier tank.

3. The baffle system of claim 2, wherein each of said baffle surfaces further comprise vent openings integrally molded within said mounting flange.

4. The baffle system of claim 1, wherein said horizontal projection is substantially 52 inches in a clarifier tank of 100 ft diameter.

5. The baffle system of claim 1, wherein said baffle surfaces each have a lower end flange.

6. The baffle system of claim 5, wherein said lower end flange of said baffle surfaces are positioned substantially 2 feet from the top of a sludge blanket of the tank.

7. The baffle system of claim 5, wherein said lower end flange of said baffle surfaces are positioned at a point midway between the average blanket height and the weir.

8. The baffle system of claim 1, wherein said upper end of said baffle surface is coupled to the peripheral wall of said clarifier tank.

9. The baffle system of claim 1, wherein said upper end of said surface is coupled to the wall of the effluent channel of said clarifier tank.

10. The baffle system of claim 1, wherein said lower end of said baffle surface is disposed at a substantially 60° angle away from said side wall of said clarifier tank.

11. The baffle system of claim 1, wherein said horizontal projection of said baffle is 24 inches into the center of the tank when the tank has a diameter of 30 feet.

12. The baffle system of claim 1, wherein said horizontal projection of said baffle is 28 inches into the center of the tank when the tank has a diameter of 40 feet.

13. The baffle system of claim 1, wherein said horizontal projection of said baffle is 32 inches into the center of the tank when the tank has a diameter of 50 feet.

14. The baffle system of claim 1, wherein said horizontal projection of said baffle is 36 inches into the center of the tank when the tank has a diameter of 60 feet.

15. The baffle system of claim 1, wherein said horizontal projection of said baffle is 40 inches into the center of the tank when the tank has a diameter of 70 feet.

16. The baffle system of claim 1, wherein said horizontal projection of said baffle is 44 inches into the center of the tank when the tank has a diameter of 80 feet.

17. The baffle system of claim 1, wherein said horizontal projection of said baffle is 48 inches into the center of the tank when the tank has a diameter of 90 feet.

18. The baffle system of claim 1, wherein said horizontal projection of said baffle is 52 inches into the center of the tank when the tank has a diameter of 100 feet.

19. The baffle system of claim 1, wherein said horizontal projection of said baffle is 56 inches into the center of the tank when the tank has a diameter of 110 feet.

20. The baffle system of claim 1, wherein said horizontal projection of said baffle is 64 inches into the center of the tank when the tank has a diameter of 130 feet.

21. The baffle system of claim 1, wherein said horizontal projection of said baffle is 68 inches into the center of the tank when the tank has a diameter of 140 feet.

22. A baffle system in a clarifier tank having a diameter of substantially 100 feet, a tank bottom, a periphery and a substantially vertical peripheral wall bounding the interior of the tank, said tank having an effluent channel, said baffle system comprising:
a plurality of baffles mounted on the clarifier tank, each baffle comprising:
a baffle surface, said baffle surface having a lower end and an upper end, the upper end of said baffle surface being coupled to a wall of the clarifier tank, the lower end of said baffle surface being disposed, at an angle away from the side wall of the clarifier tank such that said baffle surface slopes downwardly and away from the side wall, where the horizontal projection of said baffle into the center of the tank is substantially 52 inches.

23. A baffle system in a clarifier tank having a diameter of substantially 70 feet, a tank bottom, a periphery and a substantially vertical peripheral wall bounding the interior of the tank, said tank having an effluent channel, said baffle system comprising:

a plurality of baffles mounted on the clarifier tank, each baffle comprising:

a baffle surface, said baffle surface having a lower end and an upper end, the upper end of said baffle surface being coupled to a wall of the clarifier tank, the lower end of said baffle surface being disposed, at an angle away from the side wall of the clarifier tank such that said baffle surface slopes downwardly and away from the side wall, where the horizontal projection of said baffle into the center of the tank is substantially 40 inches.

24. A baffle system in a clarifier tank having a diameter of substantially 140 feet, a tank bottom, a periphery and a substantially vertical peripheral wall bounding the interior of the tank, said tank having an effluent channel, said baffle system comprising:

a plurality of baffles mounted on the clarifier tank, each baffle comprising:

a baffle surface, said baffle surface having a lower end and an upper end, the upper end of said baffle surface being coupled to a wall of the clarifier tank, the lower end of said baffle surface being disposed, at an angle away from the side wall of the clarifier tank such that said baffle surface slopes downwardly and away from the side wall, where the horizontal projection of said baffle into the center of the tank is substantially 68 inches.

* * * * *